United States Patent
Bechtle et al.

(10) Patent No.: US 10,329,789 B1
(45) Date of Patent: Jun. 25, 2019

(54) ENCLOSURE SYSTEM

(71) Applicants: Scott Douglas Bechtle, Bozeman, MT (US); Val Lint, Bozeman, MT (US); Joseph L Balay, Sugarloaf, PA (US); Thomas Balay, Drums, PA (US)

(72) Inventors: Scott Douglas Bechtle, Bozeman, MT (US); Val Lint, Bozeman, MT (US); Joseph L Balay, Sugarloaf, PA (US); Thomas Balay, Drums, PA (US)

(73) Assignee: Tambour Enclosures LLC., Bozeman, MT (US)

(*) Notice: Subject to any disclaimer, the term of this patent is extended or adjusted under 35 U.S.C. 154(b) by 0 days.

(21) Appl. No.: 16/019,335

(22) Filed: Jun. 26, 2018

(51) Int. Cl.
| | |
|---|---|
| *E04H 14/00* | (2006.01) |
| *E04H 17/00* | (2006.01) |
| *E06B 9/58* | (2006.01) |
| *E06B 9/68* | (2006.01) |
| *A01M 29/30* | (2011.01) |

(52) U.S. Cl.
CPC .............. *E04H 14/00* (2013.01); *A01M 29/30* (2013.01); *E04H 17/00* (2013.01); *E06B 9/58* (2013.01); *E06B 9/68* (2013.01); *E06B 2009/6809* (2013.01)

(58) Field of Classification Search
CPC ........ E04H 14/00; E04H 17/00; A01M 29/30; E06B 9/68; E06B 9/58; E06B 2009/6809
USPC ............................ 220/345.1, 908
See application file for complete search history.

(56) References Cited

U.S. PATENT DOCUMENTS

| | | | | |
|---|---|---|---|---|
| 3,078,917 | A * | 2/1963 | Recchione | .......... E06B 9/17046 16/87 R |
| 4,162,024 | A * | 7/1979 | Shanley | ................. A45C 13/16 206/816 |
| 4,962,973 | A | 10/1990 | Allmon | |
| 5,184,864 | A * | 2/1993 | Teigen | ....................... B60J 5/08 160/191 |
| 5,255,970 | A | 10/1993 | Theosabrata | |
| 5,494,181 | A * | 2/1996 | Denney | .................. A47B 96/00 217/62 |
| 5,740,641 | A * | 4/1998 | Oxnard | ..................... E04H 5/02 160/201 |
| 5,975,329 | A * | 11/1999 | Schmitt | ............. A47K 10/3827 220/350 |
| 6,464,283 | B2 | 10/2002 | Haddad | |
| 6,752,476 | B2 | 6/2004 | Lin | |
| D507,089 | S | 7/2005 | Enayati et al. | |
| D549,917 | S * | 8/2007 | Kassigkeit | ..................... D34/10 |

(Continued)

*Primary Examiner* — Joshua K Ihezie
(74) *Attorney, Agent, or Firm* — Plager Schack LLP; Mark H. Plager; Michael J. O'Brien

(57) ABSTRACT

An enclosure system is adapted for exterior storage. The storage system has a rear wall, joined to two side walls with a mechanical housing there between. A first track is arranged on a first inner edge of the first side wall and extends distally away from the mechanical housing while parallel to the ground surface and then downward toward the ground surface. A second track is arranged on a second inner edge on the second side wall and extends distally away from the mechanical housing while parallel to the ground surface and then downward toward the ground surface. A rolling coiling service door is housed in the mechanical housing, and is configured to roll down the first track and the second track to enclose an internal space between the first side wall and the second side wall.

4 Claims, 5 Drawing Sheets

(56) References Cited

U.S. PATENT DOCUMENTS

| | | | | |
|---|---|---|---|---|
| 7,815,068 B2 * | 10/2010 | Clark | ................ | B60J 7/085 |
| | | | | 220/345.1 |
| 8,579,151 B2 * | 11/2013 | Kodama | ................ | A45C 13/16 |
| | | | | 108/44 |
| 8,668,186 B1 * | 3/2014 | Wagner | ................ | B65F 1/1426 |
| | | | | 256/25 |
| 8,931,655 B2 * | 1/2015 | Stone | ................ | B65F 1/1607 |
| | | | | 220/212 |
| 9,038,336 B2 | 5/2015 | Albanese | | |
| D749,809 S | 2/2016 | Nichols | | |
| 9,573,758 B2 | 2/2017 | Mullet et al. | | |
| 9,624,708 B2 | 4/2017 | Balay et al. | | |
| 2005/0017536 A1 | 1/2005 | Dapprich | | |
| 2005/0086866 A1 | 4/2005 | Shirk | | |
| 2006/0006177 A1 * | 1/2006 | Clark | ................ | B60J 7/085 |
| | | | | 220/200 |
| 2013/0062025 A1 | 3/2013 | Bromberek | | |
| 2018/0106533 A1 * | 4/2018 | Lauchnor | ................ | F25D 31/007 |

\* cited by examiner

ENCLOSURE SYSTEM

BACKGROUND

The embodiments herein relate generally to civil engineering.

Prior to embodiments of the disclosed invention, there was no exterior enclosure that can withstand snow loads and totally enclose a space from above and in front when closed but be totally open from above and front when open. There were no screening enclosures that allowed a standard trash container or recycling container to be used in exterior environments exposed to bear and wildlife that prevented access without using expensive metal containers that were not designed for accessible means of access. There were no screening enclosures that allowed for hands free entrance by sanitation personnel without getting out of their vehicle and possibly injuring themselves while opening doors or repositioning heavy trash containers. Having the enclosure completely protected from unauthorized access could also prevent unauthorized use of the contents enclosed. This could apply to trash containers, valuable items requiring storage on exterior, and possibly on-site construction security. Embodiments of the disclosed invention solve these problems.

SUMMARY

An enclosure system is adapted for exterior storage. The enclosure system comprises a rear wall arranged between a first rear post and a second rear post which are both joined to a ground surface. A mechanical housing is formed by the rear wall, a first central post, a second central post, a first central wall, a second central wall, and a mechanical housing lower surface.

A first side wall is arranged between the first central post and a first forward post and further comprising a first inner edge. A first track is arranged on the first inner edge and extending distally away from the mechanical housing while parallel to the ground surface and then downward toward the ground surface.

A second side wall is arranged between the second central post and a second forward post and further comprising a second inner edge. A second track is arranged on the second inner edge and extending distally away from the mechanical housing while parallel to the ground surface and then downward toward the ground surface.

A rolling coiling service door is housed in the mechanical housing. The rolling coiling service door is configured to roll down the first track and the second track to enclose an internal space between the first side wall and the second side wall.

In some embodiments, a header can be arranged on top of the mechanical housing and partially covering the first track and the second track. An electronic control can be attached to the second forward post and electrically coupled to the mechanical housing. The electronic control engages a motor that deploys and retracts the rolling coiling service door. Internal structural supports can be arranged on the second wall in order to structurally strengthen the second wall.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
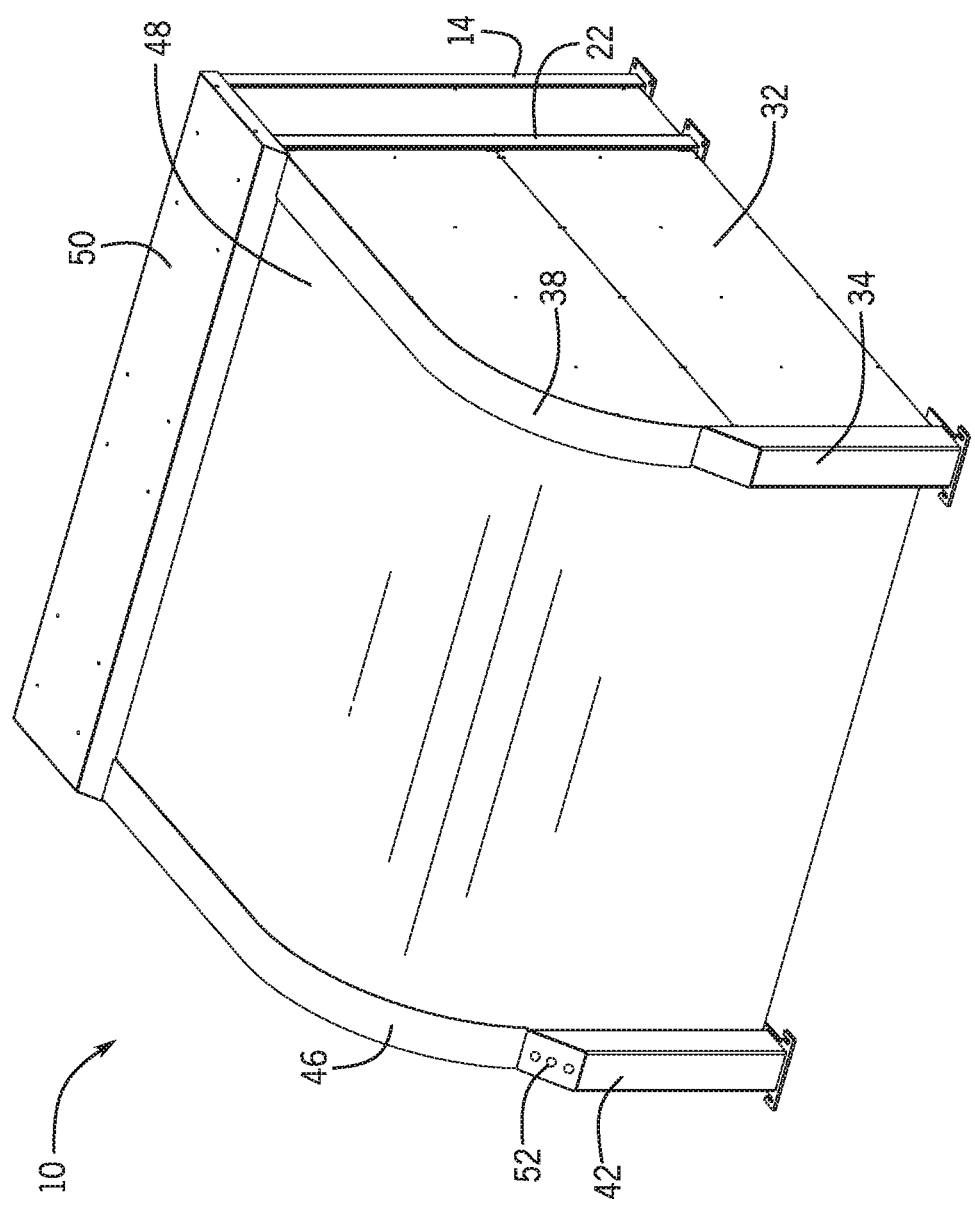
FIG. 1 shows a perspective view of one embodiment of the present invention in a closed configuration.
Figure 2:
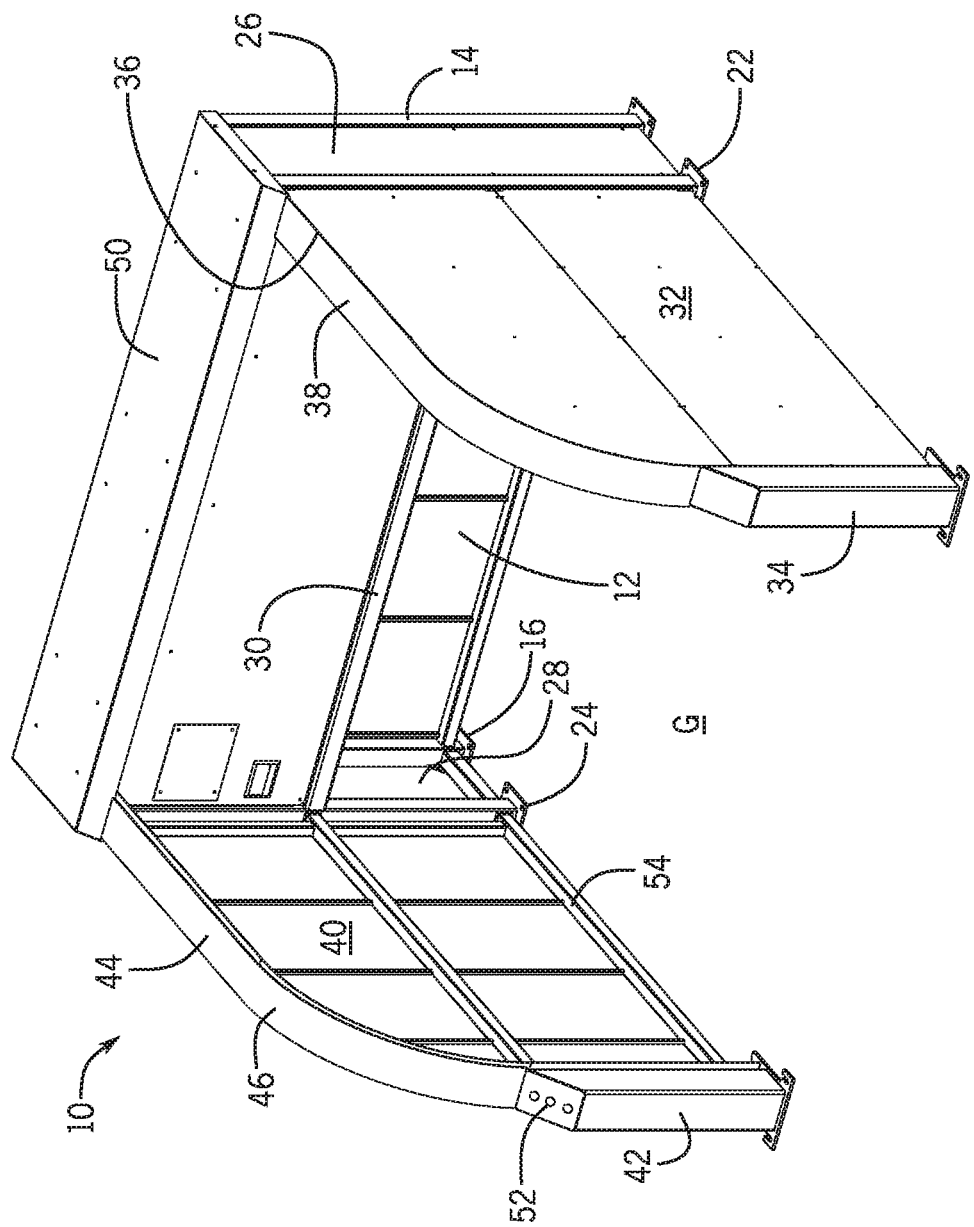
FIG. 2 shows a perspective view of one embodiment of the present invention in an open configuration.
Figure 3:
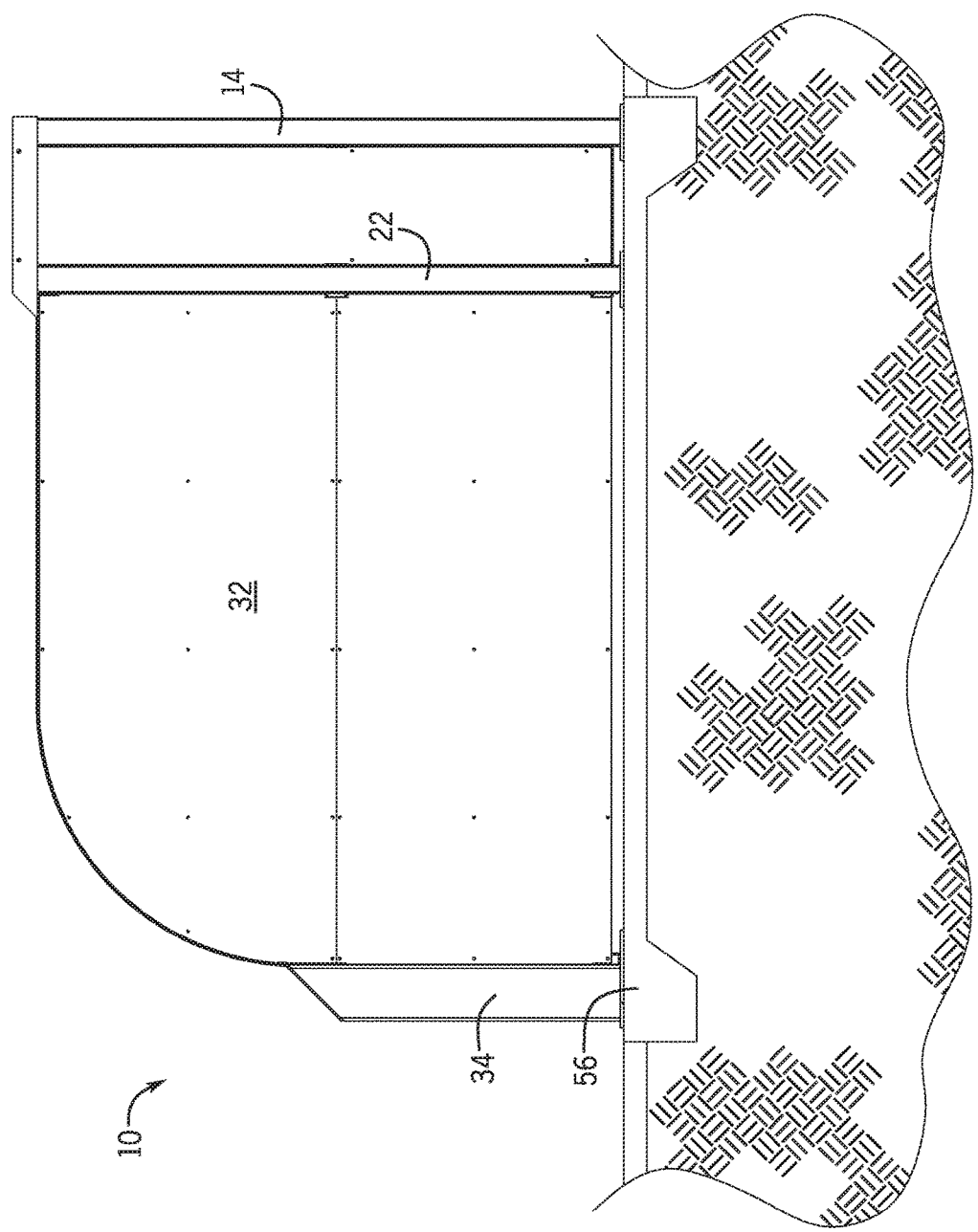
FIG. 3 shows a side view of one embodiment of the present invention.
Figure 4:
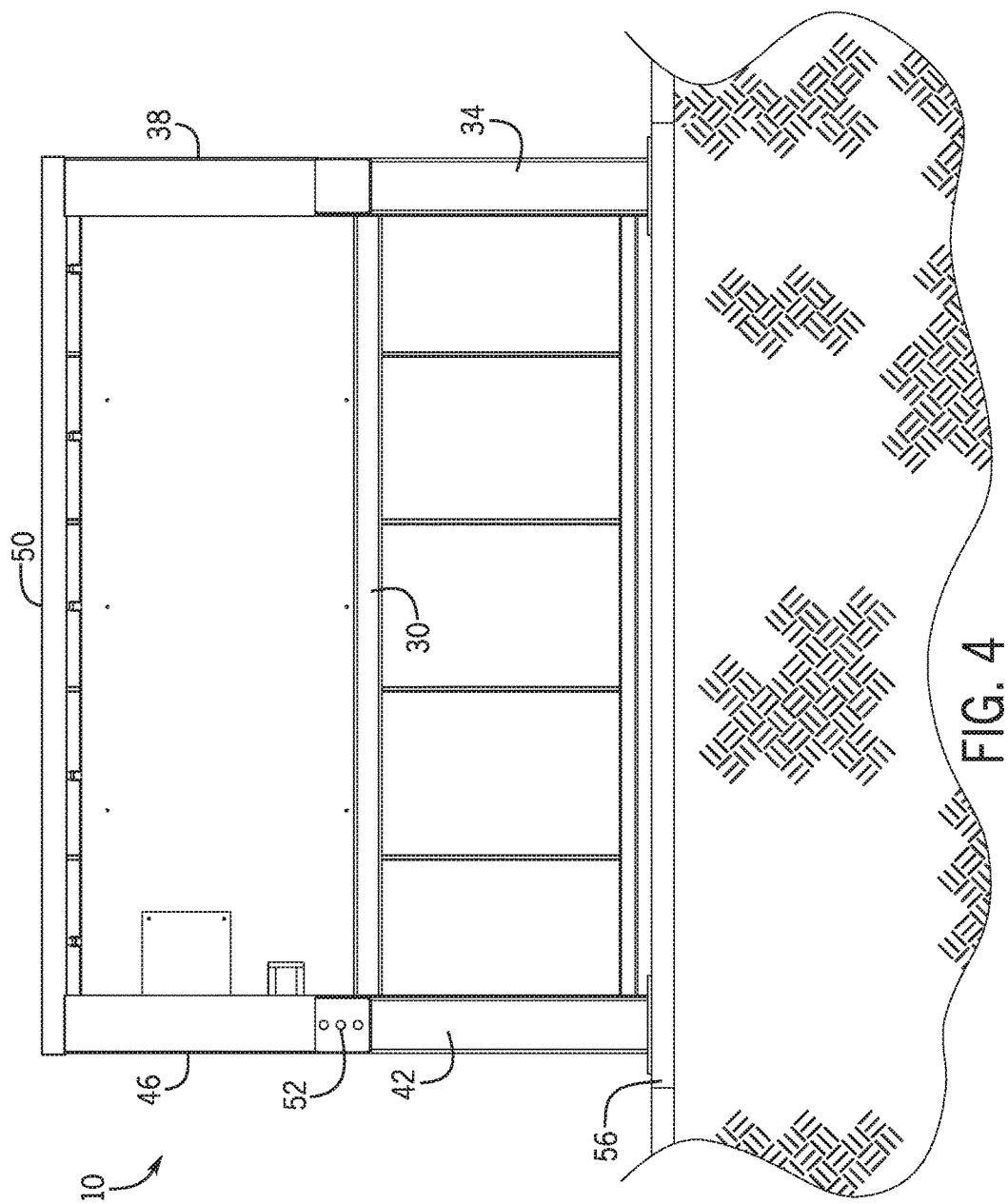
FIG. 4 shows a front view of one embodiment of the present invention.

By way of example, and referring to FIG. 1, one embodiment of an enclosure system 10 is adapted for exterior storage. The enclosure system 10 has a rear wall 12 that is arranged between a first rear post 14 and a second rear post 16 which are both joined to a ground surface G.

A mechanical housing 20 is formed by the rear wall 12, a first central post 22, a second central post 24, a first central wall 26, a second central wall 28, and a mechanical housing lower surface 30. A first side wall 32 is arranged between the first central post 22 and a first forward post 34. The first side wall 32 further comprises a first inner edge 36. A first track 38 is arranged on the first inner edge 36 and extends distally away from the mechanical housing 20 while parallel to the ground surface G and then downward toward the ground surface G.

A second side wall 40 is arranged between the second central post 24 and a second forward post 42. The second side wall 40 further comprises a second inner edge 44. A second track 46 is arranged on the second inner edge 44 and extends distally away from the mechanical housing 20 while parallel to the ground surface G and then downward toward the ground surface G.

A rolling coiling service door 48 is housed in the mechanical housing 20, and is configured to roll down the first track 38 and the second track 46 to enclose an internal space between the first side wall 32 and the second side wall 40.

In some embodiments, a header 50 can be arranged on top of the mechanical housing 20. The header 50 can partially covering the first track 38 and the second track 46.

In some embodiments, an electronic control 52 can be attached to the second forward post 42 and electrically coupled to the mechanical housing 20. The electronic control 52 engages a motor that deploys and retracts the rolling coiling service door 48.

In some embodiments, internal structural supports 54 can be arranged on the second wall 40 in order to structurally strengthen the second wall. These internal structural supports can be arranged on other walls as well as is necessary. In some embodiments the ground surface G can be a concrete slab 56.

Figure 5:
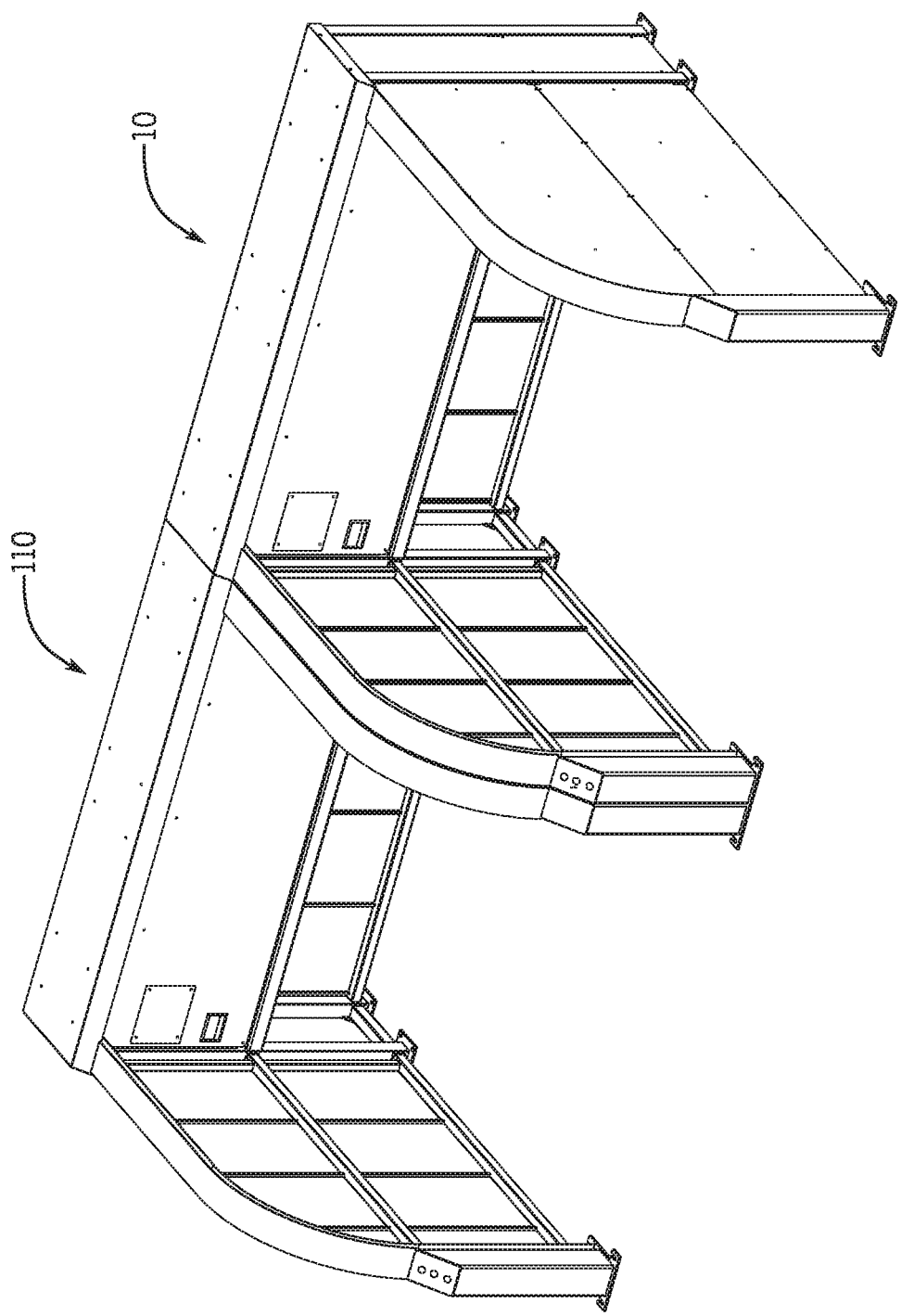
FIG. 5 shows a perspective view of one embodiment of the present invention in an open configuration.

Turning to FIG. 5, in some embodiments, multiple enclosure systems 10, 110 can be arranged next to one another. Additional enclosure systems 110 can be built substantially as the enclosure system 10 above.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An enclosure system, adapted for exterior storage; the enclosure system comprising:

a rear wall arranged between a first rear post and a second rear post which are both joined to a ground surface a mechanical housing, formed by the rear wall, a first central post, a second central post, a first central wall, a second central wall, and a mechanical housing lower surface;

a first side wall, arranged between the first central post and a first forward post and further comprising a first inner edge;

a first track, arranged on the first inner edge and extending distally away from the mechanical housing while parallel to the ground surface and then downward toward the ground surface;

a second side wall, arranged between the second central post and a second forward post and further comprising a second inner edge;

a second track, arranged on the second inner edge and extending distally away from the mechanical housing while parallel to the ground surface and then downward toward the ground surface;

a rolling coiling service door, housed in the mechanical housing, and configured to roll down the first track and the second track to enclose an internal space between the first side wall and the second side wall.

2. The enclosure system of claim 1, further comprising a header, arranged on top of the mechanical housing and partially covering the first track and the second track.

3. The enclosure system of claim 1, further comprising an electronic control, attached to the second forward post and electrically coupled to the mechanical housing; wherein the electronic control engages a motor that deploys and retracts the rolling coiling service door.

4. The enclosure system of claim 1, further comprising internal structural supports, arranged on the second wall in order to structurally strengthen the second wall.

\* \* \* \* \*